(12) United States Patent
Baba

(10) Patent No.: US 7,891,582 B2
(45) Date of Patent: Feb. 22, 2011

(54) STRUCTURE FOR ATTACHING A VEHICLE LAMP CLEANING DEVICE

(75) Inventor: Junji Baba, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 583 days.

(21) Appl. No.: 11/869,794

(22) Filed: Oct. 10, 2007

(65) Prior Publication Data

US 2008/0087744 A1 Apr. 17, 2008

(30) Foreign Application Priority Data

Oct. 11, 2006 (JP) .............................. 2006-277847

(51) Int. Cl.
B05B 1/10 (2006.01)

(52) U.S. Cl. .................................... 239/284.2

(58) Field of Classification Search .............. 239/284.1, 239/284.2, 455, 456; 15/250.01–250.05, 15/250.001–250.003
See application file for complete search history.

(56) References Cited

U.S. PATENT DOCUMENTS 6,793,153 B2 * 9/2004 Hirose et al. ............. 239/284.1

| | | |
|---|---|---|
| 7,182,276 B2 | 2/2007 | Sakai et al. |
| 7,302,731 B2 | 12/2007 | Maruyama et al. |
| 2006/0027678 A1 | 2/2006 | Kimura |

FOREIGN PATENT DOCUMENTS

| | | |
|---|---|---|
| CN | 1506168 | 6/2004 |
| CN | 1733537 | 2/2006 |
| CN | 1781776 | 6/2006 |
| JP | 2003-182536 | 7/2003 |

\* cited by examiner

*Primary Examiner*—Davis Hwu
(74) *Attorney, Agent, or Firm*—Fish & Richardson P.C.

(57) ABSTRACT

A cleaning device for a vehicle lamp includes a cylinder, a piston slidably supported in the cylinder, an ejecting nozzle attached to a leading end portion of the piston, and a bracket for insertion into an attaching hole on a bumper of the vehicle. A structure for attaching the cleaning device to the bumper includes an opening edge portion surrounding the attaching hole of the bumper, engagement portions on the bracket, each of the engagement portions being elastically deformable and including a holding portion which comes into contact with a first surface of the bumper, and abutting surface portions on the bracket to face the respective holding portions. Each of the abutting surface portions comes into contact with a second surface of the bumper, and the opening edge portion is held between the holding portions and the abutting surface portions.

8 Claims, 5 Drawing Sheets

STRUCTURE FOR ATTACHING A VEHICLE LAMP CLEANING DEVICE

The present application claims priority from Japanese Patent Application No. 2006-277847 filed on Oct. 11, 2006, the entire content of which is incorporated herein by reference.

FIELD OF THE DISCLOSURE

The present disclosure relates to a structure for attaching a cleaning device for a vehicle lamp to a bumper.

BACKGROUND

A cleaning device, which cleans a surface of a vehicle lamp such as a vehicle headlamp, includes a cylinder to which washing fluid is supplied, a piston which is slidably supported in the cylinder, and an ejecting nozzle attached to a leading end portion of the piston. When the piston and the ejecting nozzle protrude from an opening portion (an attaching hole) formed on a bumper of the vehicle body, the washing fluid is ejected from the ejecting nozzle toward the vehicle lamp.

The cleaning device further includes a bracket which is attached to the bumper. The bracket is formed in a shape of a quadrangular prism, and includes elastically deformable engagement portions provided on respective leading end portions of two outer surfaces thereof and contacting end portions provided on respective leading end portions of the other two of the four outer surfaces (see, e.g., JP 2003-182536 A).

The cleaning device is attached to the bumper so that the bracket is inserted into the attaching hole of the bumper in a state in which the engagement portions are elastically deformed. The engagement portions that are elastically returned thereafter are engaged in contact with one surface of the bumper, while the contact end portions are brought into contact with the other surface of the bumper.

However, because the engagement portions and the contact end portions are brought into contact with the bumper at positions that are shifted with respect to each other by about 90 degrees, mounting the cleaning device to the bumper may be insufficient. Sometimes it is necessary to fix the other portions with a screw.

As a result, the manufacturing cost can be high due to the large number of components and complicated assembly work.

SUMMARY

The disclosure provides an attaching structure of a cleaning device for a vehicle lamp. In some implementations, the number of components is decreased to reduce the manufacturing cost, while still allowing the cleaning device to be firmly attached to a bumper with ease.

Various aspects of the invention are set forth in the claims.

According to one aspect, a cleaning device for a vehicle lamp includes a cylinder, a piston slidably supported in the cylinder, an ejecting nozzle attached to a leading end portion of the piston, and a bracket to be inserted into an attaching hole formed on the bumper of the vehicle body. The structure for attaching the cleaning device to the bumper includes an opening edge portion surrounding the attaching hole of the bumper, and engagement portions provided on the bracket. Each of the engagement portions is elastically deformable and includes a holding portion which comes into contact with a first surface of the bumper of the structure for attaching the cleaning device to the bumper also includes abutting surface portions on the bracket so as to face the respective holding portions. Each of the abutting surface portions comes into contact with a second surface of the bumper, and the opening edge portion is held between the holding portions and the abutting surface portions.

According to another aspect, a cleaning device for a vehicle lamp includes a cylinder into which washing fluid is supplied, a piston slidably supported in the cylinder, an ejecting nozzle attached to a leading end portion of the piston and from which the washing fluid is ejected toward the vehicle lamp, and a bracket on a tip end portion of the cylinder. The bracket is formed with cuts, each of which has a horizontal cut portion along a circumferential direction of the bracket and a pair of cut portions extending from respective ends of the horizontal cut portion. The bracket includes base portions sectioned by the horizontal cut portion and the pair of cut portions of each of the cuts, holding portions protruding outwardly from each of the base portions along the circumferential direction of the bracket; and abutting surface portions protruding outwardly from an outer surface of the bracket along the circumferential direction of the bracket. The abutting surface portions face the respective holding portions.

Other aspects and advantages of the invention will be apparent from the following description, the drawings and the claims.

DETAILED DESCRIPTION

Various examples of implementations of the invention are explained below with reference to the drawings. The following examples do not limit the scope of the invention. For example, although description will be given in connection with an attaching structure of a cleaning device for a vehicle headlamp lamp, the invention can be applied to an attaching structure of a cleaning device for any kind of vehicle lamp.

Figure 1:
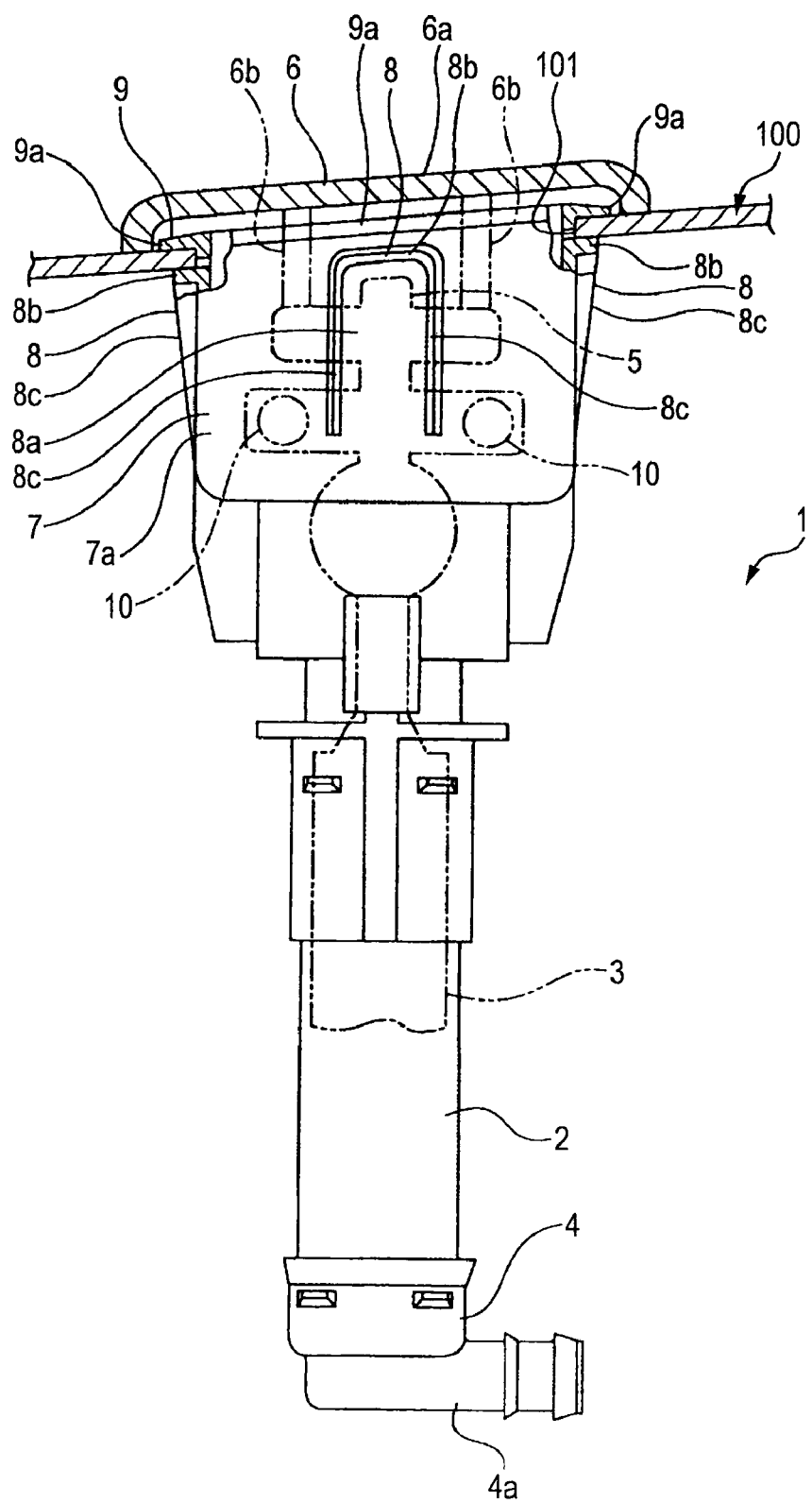
FIG. 1 is a partial sectional view illustrating an example of the invention in which a cleaning device is attached to a bumper.

As shown in FIG. 1, a cleaning device 1 is attached to a bumper 100 of a vehicle body. The cleaning device 1 can partially protrude from an attaching hole 101 formed on the bumper 100. The attaching hole 101 may be formed, for example, in a rectangular shape.

The cleaning device 1 includes a cylinder 2 and a piston 3, which is slidably supported in the cylinder 2.

Figure 2:
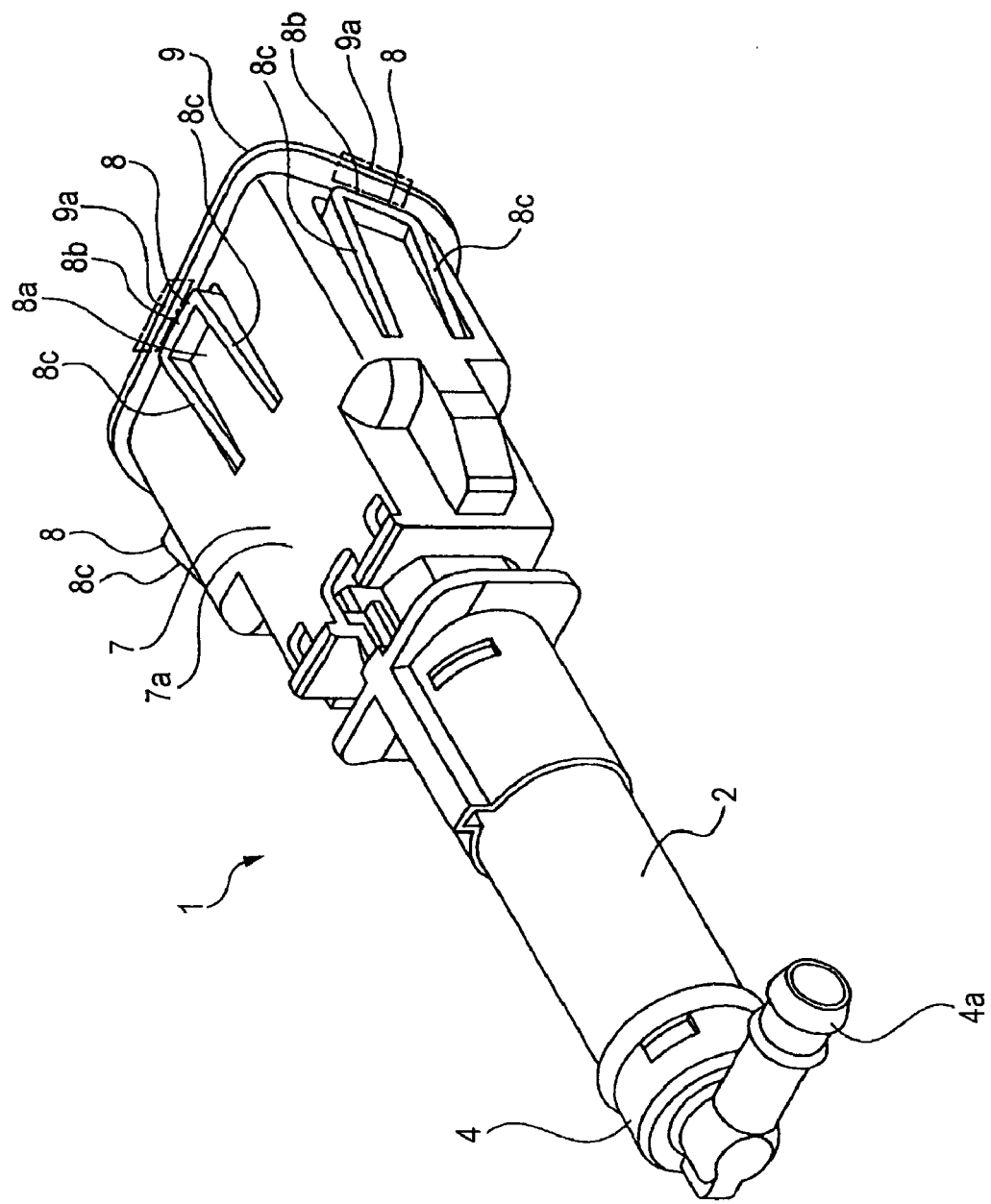
FIG. 2 is a perspective view of the cleaning device from which a nozzle cover is removed.

A back cap 4 is attached to a base end of the cylinder 2. The back cap 4 has a connecting pipe portion 4a (see FIGS. 1 and 2). The connecting pipe portion 4a is connected to a pressure pump (not shown) through a hose arranged inside the vehicle body. The pressure pump is fixed to the vehicle body and is connected to a washing fluid tank (not shown).

A tension spring (not shown) is disposed inside the cylinder 2. The piston 3 is pulled toward the back cap 4 with respect to the cylinder 2 by means of the tension spring.

A holder 5 is attached to a leading end portion of the piston 3, and a nozzle cover 6 is attached to the holder 5. The nozzle cover 6 includes a closing portion 6a which covers the holder 5 and connecting arms 6b, 6b extending from an inner surface of the closing portion 6a. The connecting arms 6b, 6b are connected to the holder 5, respectively.

A bracket 7 is integrally provided on a leading end portion of the cylinder 2 and may be formed of a resin material such as polyacetal. The bracket 7 is formed in a shape of a prism, e.g., a quadrangular prism, according to the illustrated implementation.

Four surfaces of an outer surface 7a of the bracket 7 are provided with engagement portions 8 respectively. Each of the four surfaces is formed with a cut having a C shape facing a base end side, and each of the engagement portions 8 is provided on an inner side of the respective C-shaped cuts. Each of the engagement portions 8 includes a base portion 8a arranged on a on a same plane as the outer surface 7a, a holding portion 8b extending outward from a leading edge of the base portion 8a, and inclined portions 8c extending outward from respective side edges of the base portion 8a. Each of the inclined portions 8c is inclined such that an outward protruding amount becomes larger toward a side of the holding portion 8b.

As described above, each of the engagement portions 8 is positioned on the inner side of the respective C-shaped cuts. Thus, the engagement portions 8 are elastically deformable such that respective base edge portions of the engagement portions 8 serve as fulcrums of deformation.

Figure 3:
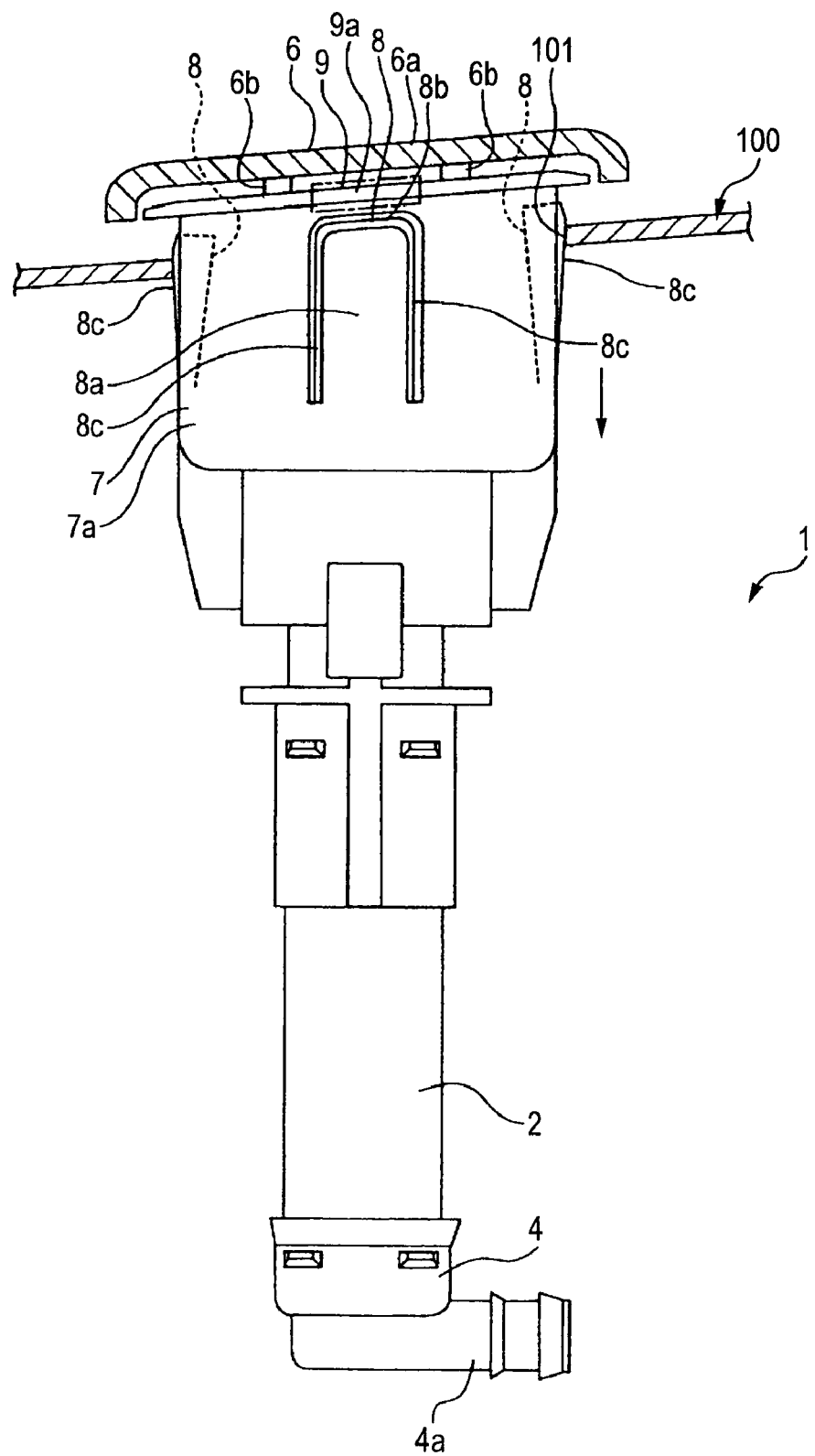
FIG. 3 is a partial sectional view showing the cleaning device being inserted into an attaching hole of the bumper.

A flange portion 9 is provided on the leading end side of the bracket 7. The flange portion 9 extends outward from the outer surface 7a, and a gap between the flange portion 9 and the respective holding portions 8b of the engagement portions 8 is substantially equal to a thickness of the bumper 100. The flange portion 9 includes abutting surface portions 9a which face the holding portions 8b of the engagement portions 8 (i.e., portions surrounded by one-dotted chain lines in FIGS. 2 and 3).

As shown in FIG. 1, ejecting nozzles 10, 10 are disposed inside the bracket 7.

The cleaning device 1 may be attached and fixed to the bumper 100 in the following manner.

The cleaning device 1 is inserted into the attaching hole 101 of the bumper 100 from a side of the front surface of the bumper 100. As the cleaning device 1 is inserted into the attaching hole 101, the respective inclined portions 8c of the engagement portions 8 of the bracket 7 are brought into sliding contact with an opening edge portion of the attaching hole 101, whereby the engagement portions 8 are elastically deformed inwardly (see FIG. 3).

As the cleaning device 1 is further inserted into the attaching hole 101, leading edges of the engagement portions 8 become coincident with a rear-side opening edge portion of the attaching hole 101 so that the elastically deformed engagement portions 8 are elastically returned, whereby the holding portions 8b are brought into contact with a rear surface of the bumper 100 while the flange portion 9 is brought into contact with the front surface of the bumper 100 (see FIG. 1).

Figure 4:
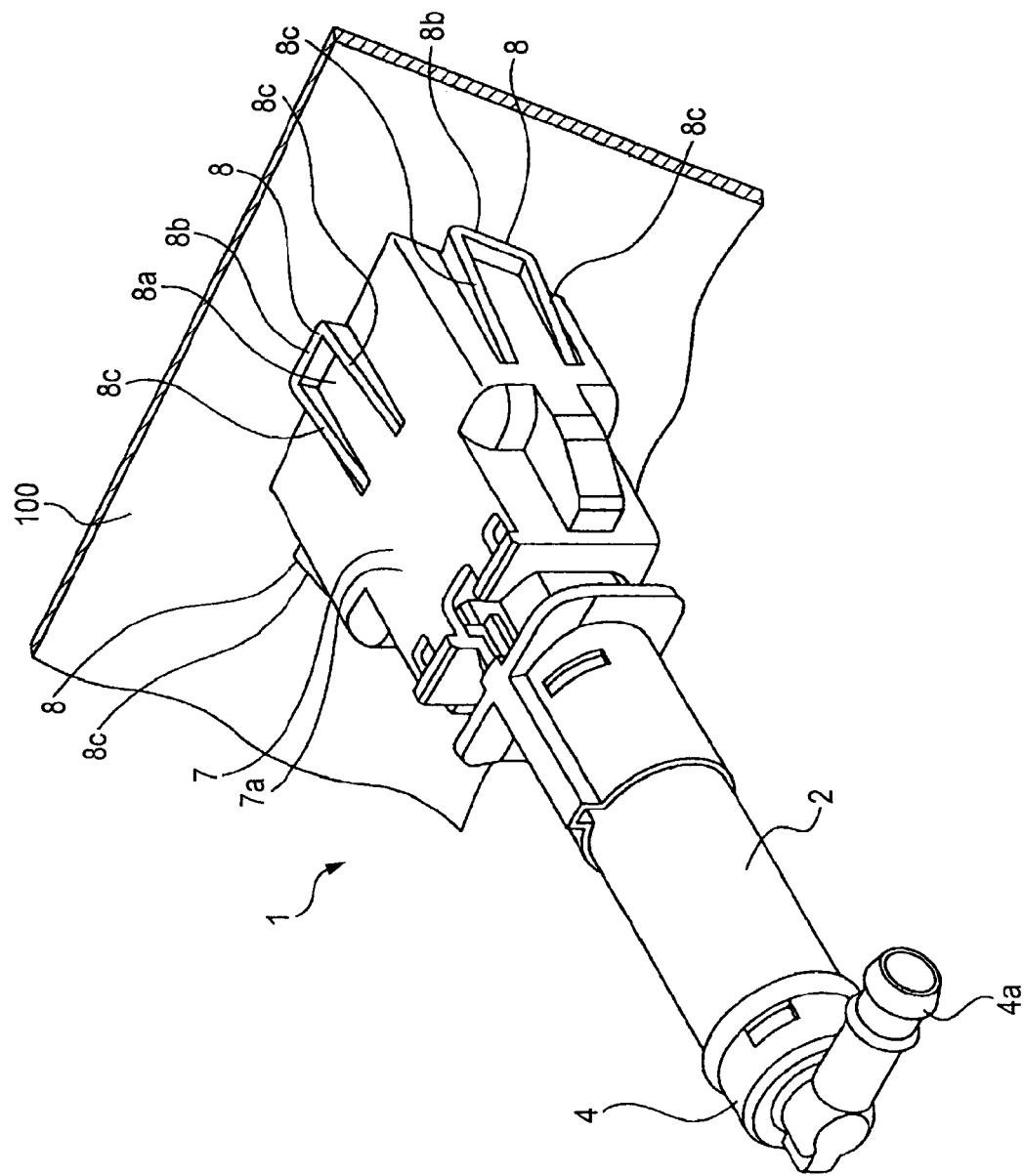
FIG. 4 is a perspective view showing the cleaning device being attached to the bumper.

Accordingly, the opening edge portion of the attaching hole 101 of the bumper 100 is held between the holding portions 8b of the engagement portions 8 and the abutting surface portions 9a of the flange portion 9, whereby the cleaning device 1 is fixed to the bumper 100 (see FIGS. 1 and 4).

When washing fluid is fed from the washing fluid tank into the cylinder 2 with the cleaning device 1 fixed to the bumper 100, the internal pressure of the cylinder 2 becomes high so that the piston 3 protrudes from the cylinder 2 against a pulling force of the tension spring. Accordingly, the ejecting nozzles 10 and the nozzle cover 6 protrude outside of the vehicle body.

When the piston 3 protrudes from the cylinder 2 and the water pressure of the washing fluid in the cylinder 2 reaches a predetermined pressure, a check valve (not shown) within the cylinder 2 opens. Accordingly, the washing fluid flows into the ejecting nozzles 10 so that the washing fluid is ejected from the ejecting nozzles 10 toward a lens cover of the headlamp (not shown).

When the supply of the washing fluid from the washing fluid tank to the cylinder 2 is stopped, the check valve closes in accordance with a reduction in the water pressure, and the piston 3, the ejecting nozzles 10, and the nozzle cover 6 are moved by the pulling force of the tension spring and are thus returned to their initial positions before washing.

As described above, the cleaning device 1 is inserted into the attaching hole 101 of the bumper 100 so that the engagement portions 8 are elastically deformed. The elastically deformed engagement portions 8 then are returned elastically so that the opening edge portion of the attaching hole 101 is held between the holding portions 8b and the abutting surface portions 9a whereby the cleaning device 1 is attached and fixed to the bumper 100.

Because the opening edge portion of the attaching hole 101 is held between the holding portions 8b and the abutting surface portions 9a which are arranged at opposing positions, the cleaning device 1 can be firmly attached to the bumper 100. In addition, because the cleaning device 1 is fixed to the bumper 100 only by inserting the cleaning device 1 into the attaching hole 101, it is possible to attach the cleaning device 1 to the bumper 100 with ease.

Moreover, the abutting surface portions 9a are provided as a part of the flange portion 9 and are connected to each other in a circumferential direction through the other parts of the flange portion 9. Therefore, rigidity of the abutting surface portions 9a is high, whereby the cleaning device 1 can be attached to the bumper 100 even more firmly.

Also, because a screw is not required to fix the cleaning device 1 to the bumper 100, it is possible to reduce the manufacturing cost as a result of a decrease in the number of components.

Although the abutting surface portions 9a are provided as a part of the flange portion 9 in the foregoing example, the abutting surface portions 9a also can be provided such that they are not connected to each other in the circumferential direction through the other parts of the flange portion 9, in so far as the abutting surface portions 9a are positioned so as to oppose the holding portions 8b of the engagement portions 8.

According to the example cleaning device 1 described above, the bracket 7 is in the shape of a quadrangular prism, and the engagement portions 8 are provided on the four surfaces of the outer surface 7a so that the opening edge portion of the attaching hole 101 of the bumper 100 is held at four portions. Therefore, the cleaning device 1 can be securely fixed to the bumper 100, and displacement of the cleaning device 1 with respect to the bumper 100 can be prevented.

The number and size of the engagement portions 8 to be provided can vary so long as the cleaning device 1 is securely fixed to the bumper 100 and at least a minimum rigidity of the bracket 7 is maintained.

According to the example cleaning device 1 described above, the engagement portions 8 include the inclined portions 8c which slide on the opening edge portion of the attaching hole 101 when inserting the cleaning device 1 into the attaching hole 101. Therefore, it is possible to insert the cleaning device 1 smoothly into the attaching hole 101.

Although the cleaning device 1 is fixed by being inserted into the attaching hole 101 from a side of the front surface of the bumper, it also is possible to insert the cleaning device into the attaching hole 101 from a side of the rear surface of the bumper 100 by providing the engagement portions on a side of the leading end portion of the bracket than the flange portion. In such a case, the direction of the inclined portion of the engagement portion is reversed.

As described above, it is possible to insert the cleaning device into the attaching hole 101 from the side of the rear surface of the bumper 100 by providing the engagement portions on a side of the leading end portion of the bracket than the flange portion. Nevertheless, where a flange portion 9 having a small width (thickness) in a longitudinal direction of the cleaning device 1 is provided on a side of the tip portion of the bracket 7 of the engagement portions 8, the amount of outward protrusion of the cleaning device 1 from the bumper 100 is small when the cleaning device 1 is attached to the bumper 100. Therefore, it is possible to improve the vehicle appearance.

Figure 5:
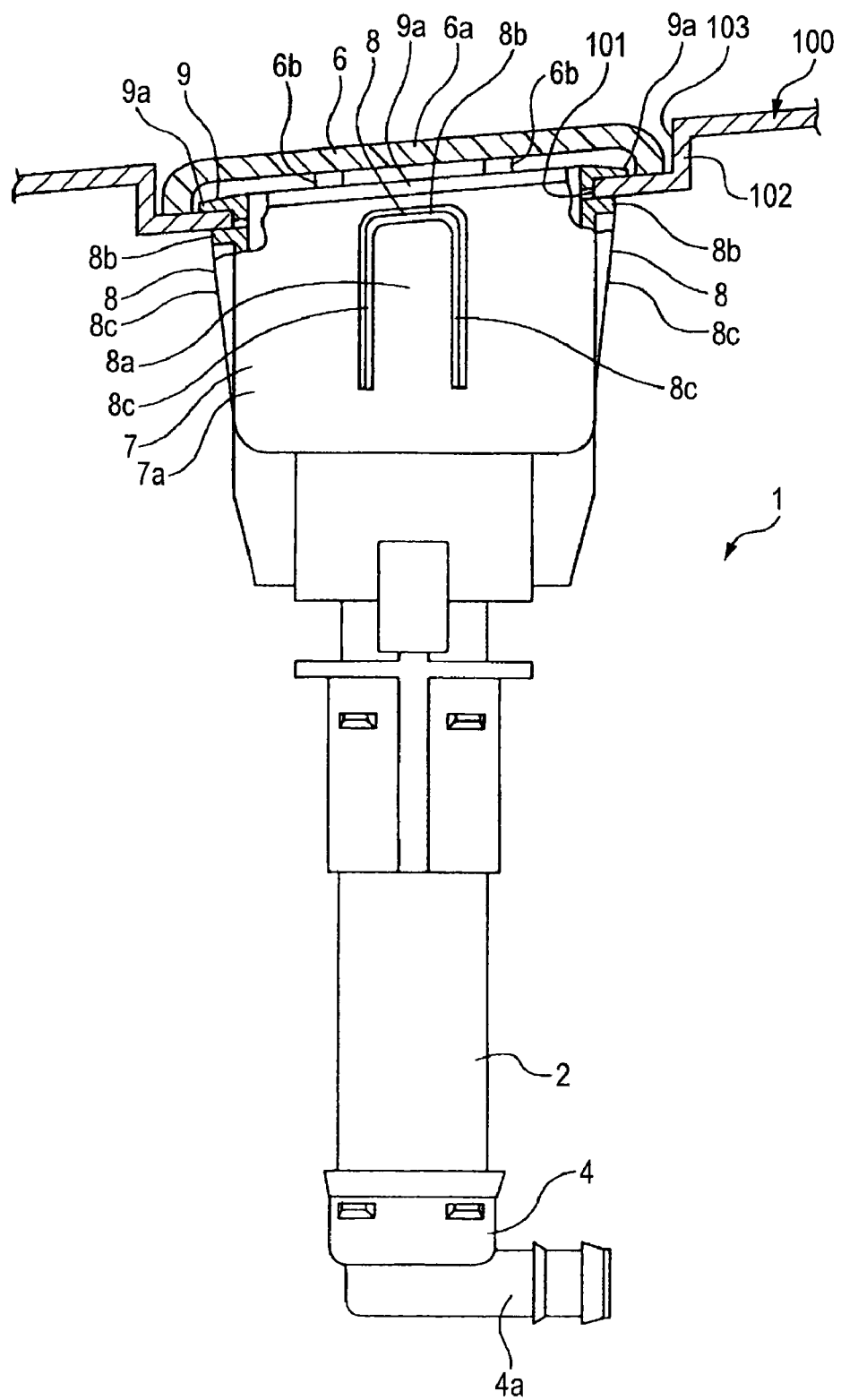
FIG. 5 is a partial sectional view of the cleaning device fixed to a bumper having a recess portion.

According to another example shown in FIG. 5, a step 102 may be formed on the bumper 100 to provide a recess portion 103 which faces toward a side of the front surface of the bumper 100. The nozzle cover 6 may be disposed in the recess portion 103, thereby reducing the amount of outward protrusion of the cleaning device 1 when the cleaning device 1 is fixed to the bumper 100. In such a case, an external surface of the nozzle cover 6 and an external surface (the front surface) of the bumper 100 can be placed substantially on the same level as one other.

Various changes and modification may be made with respect to the foregoing implementations. Accordingly, other implementations are within the scope of the claims.

What is claimed is:

1. A structure for attaching a vehicle lamp cleaning device to a bumper of a vehicle body, wherein the cleaning device comprises a cylinder, a piston slidably supported in the cylinder, an ejecting nozzle attached to a leading end portion of the piston, and a bracket for insertion into an attaching hole on the bumper, the structure comprising:
   an opening edge portion surrounding the attaching hole of the bumper;
   a plurality of engagement portions on the bracket, wherein each of the engagement portions is elastically deformable and includes a holding portion to contact a first surface of the bumper, and wherein each of the engaging portions further includes an inclined portion protruding outwardly from the bracket, and a protruding amount of the inclined portion is larger toward a direction along which the bracket is inserted into the attaching hole; and
   a plurality of abutting surface portions on the bracket to face the respective holding portions and to contact a second surface of the bumper,
   wherein the opening edge portion is held between the holding portions and the abutting surface portions.

2. The structure according to claim 1, wherein the bracket includes a flange portion extending outwardly around a circumferential direction of the bracket, and, when the structure is attached to the bumper, the flange portion contacts the second surface of the bumper,
   wherein the plurality of abutting surface portions are part of the flange portion.

3. The structure according to claim 1, wherein the bracket is in a shape of a quadrangular prism, and the engaging portions are disposed on each of four outer surfaces of the bracket.

4. The structure according to claim 1, wherein the cleaning device further comprises a nozzle cover which covers the ejecting nozzle,
   wherein the structure further comprises a recess portion on the bumper such that the first surface of the bumper is an inner surface of the recess portion,
   wherein the nozzle cover is disposed inside the recess portion.

5. The structure according to claim 1, wherein the first surface is a front surface of the bumper and the second surface is a rear surface of the bumper, and the bracket is insertable into the attaching hole from a side of the front surface.

6. A cleaning device for a vehicle lamp, the cleaning device comprising:
   a cylinder to receive a supply of washing fluid;
   a piston slidably supported in the cylinder;
   an ejecting nozzle attached to a leading end portion of the piston and operable to eject the washing fluid toward the vehicle lamp;
   a bracket on a tip end portion of the cylinder, wherein the bracket includes a plurality of cuts, each of the cuts having a horizontal cut portion along a circumferential direction of the bracket and a pair of cut portions extending from respective ends of the horizontal cut portion,
   wherein the bracket comprises:
      a plurality of base portions sectioned by the horizontal cut portion and the pair of cut portions of each of the cuts;
      a plurality of holding portions protruding outwardly from each of the base portions along the circumferential direction of the bracket; and
      a plurality of abutting surface portions protruding outwardly from an outer surface of the bracket along the circumferential direction of the bracket, wherein the plurality of the abutting surface portions faces the respective holding portions.

7. The cleaning device according to claim 6, wherein the bracket is in a shape of a quadrangular prism, wherein the plurality of base portions, the plurality of holding portions, and the plurality of abutting surface portions are disposed on each of four outer surface portions of the bracket.

8. The cleaning device according to claim 6, wherein the bracket includes a plurality of pairs of inclined portions, wherein each of the pairs of inclined portions protrudes outwardly from each of the base portions along the pair of cut portions, wherein a protruding amount of each of the pairs of inclined portion is larger near each of the holding portions.

\* \* \* \* \*